Figure 13:
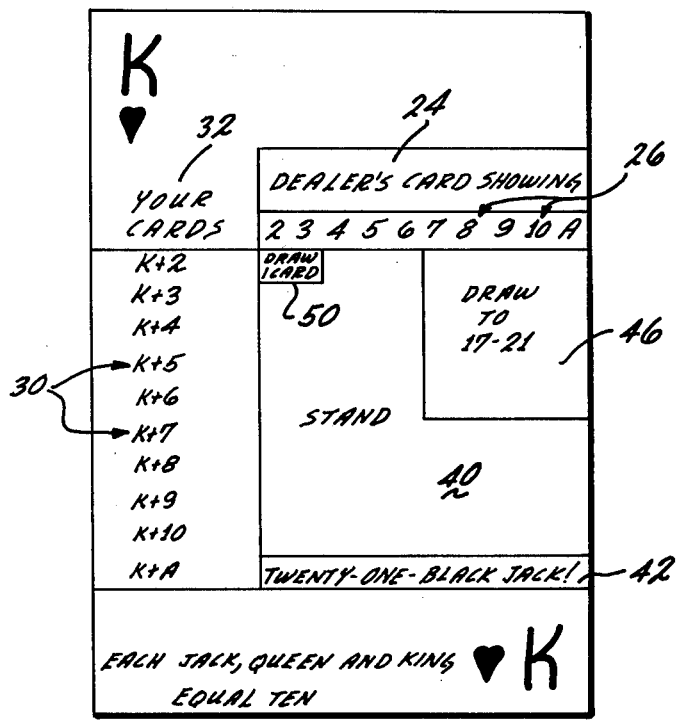

United States Patent [19]

Cywar

[11] 4,014,549
[45] Mar. 29, 1977

[54] BLACKJACK CARD DECK

[76] Inventor: Sigmund Cywar, 2196 Vista Grande, Vista, Calif. 92083

[22] Filed: Apr. 2, 1975

[21] Appl. No.: 564,265

[52] U.S. Cl. .............................. 273/152.41; 35/8 B
[51] Int. Cl.² .......................................... G09B 19/22
[58] Field of Search ................. 273/152.41, 152.42; 35/8 B

[56] References Cited

UNITED STATES PATENTS

| 491,302 | 2/1893 | Ames | 35/8 B X |
|---|---|---|---|
| 2,133,746 | 10/1938 | Hawgood | 273/152.41 |
| D88,324 | 11/1932 | Shaffer | 273/152.42 X |

FOREIGN PATENTS OR APPLICATIONS 182,098   4/1936   Switzerland ................. 273/152.42

Primary Examiner—Anton O. Oechsle
Attorney, Agent, or Firm—Duane C. Bowen

[57] ABSTRACT

A conventional card deck except each card has printed thereon information disposed in rows and files. Files are serially marked to indicate the value of the dealer's card showing. Rows are serially marked with the value of the particular card of the player plus the value of each other card that could be associated as the second card of the player. The intersecting areas of rows and files are marked as to the action the player should take in playing blackjack.

5 Claims, 13 Drawing Figures

Fig. 1, Fig. 2, Fig. 3, Fig. 4

Fig. 5

| 5♥ 32 | 24 DEALER'S CARD SHOWING 26 |
|---|---|
| YOUR CARDS | 2 3 4 5 6 7 8 9 10 A |
| 5+2 5+3 44 5+4 5+5 5+6 30 5+7 5+8 5+9 50 5+10 5+A | DRAW TO 12-16 / DRAW TO 17-21 46 DOUBLE YOU GET ONE CARD 52 DRAW 1 CARD / 40 STAND / DRAW TO 17-21 SEE ACE CARD 54 |

THIS IS A STRONG CARD FOR DEALER    ♥5

Fig. 6

| 6♦ 32 | 24 26 DEALER'S CARD SHOWING |
|---|---|
| YOUR CARDS | 2 3 4 5 6 7 8 9 10 A |
| 6+2 6+3 44 6+4 6+5 52 6+6 6+7 48 6+8 30 6+9 6+10 6+A | DRAW TO 12-16 / DRAW TO 17-21 DOUBLE YOU GET ONE CARD * SPLIT 46 40 STAND / DRAW TO 17-21 46 54 SEE ACE CARD |

* TREAT EACH 6 TO ABOVE CHART BY SPLITTING YOU DOUBLE YOUR BET    ♦6

Fig. 7

| 7♠ 32 | 24 26 DEALER'S CARD SHOWING |
|---|---|
| YOUR CARDS | 2 3 4 5 6 7 8 9 10 A |
| 7+2 7+3 50 7+4 7+5 30 7+6 7+7 7+8 7+9 7+10 7+A | DOUBLE YOU GET ONE CARD / DRAW TO 17-21 46 52 DRAW 1 CARD 40 STAND / DRAW TO 17-21 * SPLIT 48 STAND 40 46 SEE ACE CARD 54 |

*TREAT EACH 7 TO ABOVE CHART READ BLACK JACK'S GOLDEN RULES IN BOOKLET    ♠7

Fig. 8

| 8♣ 32 | 26 24 DEALER'S CARD SHOWING |
|---|---|
| YOUR CARDS | 2 3 4 5 6 7 8 9 10 A |
| 8+2 8+3 52 8+4 8+5 50 8+6 30 8+7 8+8 48 8+9 8+10 8+A | DOUBLE YOU GET ONE CARD / DRAW TO 17-21 DRAW 1 CARD 40 STAND / DRAW TO 17-21 46 * SPLIT 46 40 STAND |

*TREAT EACH 8 TO ABOVE CHART ALWAYS SPLIT EIGHTS    ♣8

Fig.9, Fig.10, Fig.11, Fig.12

BLACKJACK CARD DECK

BRIEF SUMMARY OF THE INVENTION AND OBJECTIVES

My invention relates to a card deck adapted for learning and improving in blackjack on the part of the player.

One current approach to improved playing of blackjack is the development of recommendations as to actions of a player based on mathematical probabilities, in view in each instance of the dealer's card showing and the cards the player holds. This is not to say whether or not all writers or teachers on the subject are in exact agreement, although consensus in most matters would seem likely as the general basis of recommendations is, as suggested, that of mathematical probability. This is not the only approach to improved playing of blackjack, but it is one having general usefulness to players including novice or occasional players on one hand and frequent players on the other hand. Different blackjack methods would include the more intricate effort to keep track of all cards from a deck that have been played and their effect on probabilities, physiological play such as bluffing, etc. The main difficulty with the method of playing based on a good appraisal of mathematical probabilities is one of learning recommended actions.

I have developed the idea it would be feasible to condense recommended actions (for a player, not for a dealer) to the extent it would be feasible to display on the individual cards of a deck of cards all essential information needed to follow said recommended actions. Part of the concept I gradually developed, through experimentation and design efforts over a period of time, was that each card only needs essentially three things: (a) the possible values of the dealer's card showing, (b) the various commbinations with the player's card in question of the other values of second cards, and (c) the recommended action based on the values of (a) and (b). Part of the idea I developed was that this condensation was possible by a grid-type display. I further found out it was feasible to block out recommended actions (c) if the values (a) and (b) were serially arranged, meaning that there would not need to be room to print playing instructions at each intersection of rows and files. By this I mean that one block frequently can represent parts of several rows and/or files, due to common recommended action. Part of my concept was that player instruction set forth directly on a set of learning cards would be much better than trying to learn from a separate book, booklet or instruction sheet. Another part of my concept was that a deck of cards with such marking could be used merely for learning situations, although they would not be usable in many regular playing situations, i.e., it appears to be doubtful that Los Vegas casinos, for example, would want to use for blackjack anything other than regular decks of playing cards.

It will be observed from the above that a number of considerations, including the above matters among others, were related in my thinking, experimentation and design efforts. The objects of my invention include: to develop a learning and practicing blackjack deck of cards (as distinguished from a regular deck of cards that may be required in regular, non-practice playing); to devise means to display directly on a deck of cards the essential information needed to follow recommended player actions based on mathematical probabilities in view of the card the dealer shows and the cards the player holds; to devise a grid or matrix display on each card showing, serially, in rows and files, values of cards the dealer may show and combinations of cards the player may have and showing at grid intersections the recommended actions, and to block out common recommended actions in such grid to avoid having to print such recommendations at each row and file intersection.

My invention will be best understood, together with additional objectives and advantages thereof, from the following description, read with reference to the drawings, in which:

FIGS. 1 to 13 are plan views representative of the faces of the cards in a deck of blackjack playing cards, according to a specific embodiment of my invention. Thirteen cards are shown out of a normal fifty-two card deck. The thirteen selected variously show spade, heart, diamond and club suits and the thirteen cards shown include ace, king, queen, jack and numbers ten to two, so as to completely indicate the invention without illustrating all fifty-two cards.

There is no reason for the cards to be other than conventional as to size and thickness. The backs of the cards likewise can be conventional, as to decorative printing, i.e., abstract design, picture, proprietary name, etc., as in other playing cards. My invention concerns what is on the faces of the cards.

Various books or the like have been published on how to play blackjack. One approach to instruction, as before indicated, is based on mathematical probabilities dealing merely with the following information in the play of each hand: (a) the dealer's card showing and (b) the two cards first dealt to the player. The information and system set forth on my cards follow that same approach, as will be apparent from the description below.

My cards may be considered to be designed according to a grid, i.e., a series of vertical files and intersecting horizontal rows, although it is deemed unnecessary to extend all of the grid lines. A series of grid lines 20 are shown in dashed lines in FIG. 1 to demonstrate that the design has a grid basis. It would be feasible to extend all grid lines 20 for the files and rows but it is preferred not to do so because; (a) such appearance is considered to be inferior to the partial block indication of grid boundaries shown in the drawings herein, (b) the player can follow only partly indicated row and file lines without having them all set forth (again, the blocks hereinafter described, indicate the nature and some lines of the grid), (c) the information set forth on the cards may be confused rather than improved by complete grid lines, and (d) blocking of common instructions would be interfered with by the extra lines. On the other hand, a compromise could be effected by extending more of the lines of rows and files, or all of the rows and files, by faint lines 20 (that also could be differently colored), and by putting the information shown in the drawings in hold lines and type.

The drawings show a choice to have the files represent the dealer's card showing and the rows to represent the player's cards. As each of these two types of information represent ten basic values, obviously the rows could represent the dealer's card showing and the files could represent the player's cards. I prefer to assign the rows to the player's cards. The reasons for this selection may be partly subjective but it will be observed that the player's cards indicia involve two bits of information each time, i.e., "2 + 7", which are easier to read horizontally, as most writing in English is horizontally arranged. Further, the blocks indicating recommended actions tend to be horizontally elongated as shown. If instead the blocks tended to be vertically elongated, the indicia as to narrow blocks would need to be vertically oriented, which is difficult to read for those accustomed to horizontal writings. It is also my opinion that correlating vertical files to elongated horizontal blocks is mentally easier than correlating horizontal rows to elongated vertical blocks.

As shown, the area of vertical files is designated by blocked indicia 24 that the files represent "DEALER'S CARD SHOWING". The vertical files 26 may be considered to be indicated or marked by the indicia "2, 3, 4, 5, 6, 7, 8, 9, 10, A" and the files may be considered to be mentally extended in the grid (and partly blocked out). These vertical files 26 are indicated in the dashed lines in FIG. 1.

The horizontal row markings 30 (or their designation of rows 30 as indicated particularly in FIG. 1) have a title 32 "YOUR CARDS" which indicates the player's cards. The first number or designation, such as "ACE" in FIG. 1 or "2" in FIG. 2 designates the value of the card in question which also appears at the upper left and lower right corners, along with suit designations, i.e., the symbol for hearts and "A" in FIG. 1 and the symbol for diamonds and "2" in FIG. 2. The first number or designation in use will apply to one card being studied by the player and the second number or designation with be his other card. If in FIG. 1, for example, the player is studying an ace and has a three as his other card, then he will follow the third horizontal row. If the dealer, in that case, had an eight showing, the player would correlate the third horizontal row with the seventh vertical file from the left and would know to draw to 17 – 21.

Note in both file indicia 26 and in the second unit of the row indicia 30 that the king, queen and jack are not given separate rows but instead their value in blackjack, ten, may be used if one of these face cards is the second card.

At the intersections of rows and files, lines defining blocks are used to indicate intersections in which the same common action is recommended. The boundaries of the blocks coincide with the boundaries of rows and files. For example, in FIG. 10, the lowermost block completely defines the lowermost row for "10 + A". In the same figure the left line of the block at the upper right is the left margin of the "7" file, whereas its bottom line is the bottom margin of the "10 + 6" row.

There are a limited number of possible player actions. As indicated before, the recommended actions disclosed herein appear to follow general current advice to players based on mathematical probabilities. They could be changed, modified or elaborated upon, but the specific examples given in the drawings are based on my best knowledge at this time as to actions that should be taken in playing blackjack to obtain the best results over a period of time in a method of play only based on mathematical odds on the cards showing in play in a deal.

One category is to stand, indicated by blocks 40, meaning that the player wants no more cards.

Another block 42 reads "TWENTY-ONE-BLACK-JACK!" When this card combination is achieved, the player turns his cards face up and wins unless the dealer has twenty-one with his first two cards.

A further block 44 is entitled "DRAW TO 12 – 16", meaning the player asks to be "hit" until he reaches 12 – 16.

A similar block 46 is entitled "DRAW TO 17 – 21", meaning to ask to be hit until that level is reached.

Block 48 is marked "SPLIT". Identical cards are placed face up. The dealer will deal a second card on the first one. The player will treat this as a pair and will follow directions for the pair. Then the player will be dealt a second card on the second card that was "faced up" and directions will be followed for the resultant pair.

If a third or fourth similar card is dealt (i.e., 4-4-4-4) then all will be split. Note the asterisked footnote on the ace card, FIG. 1, that the player will receive one card only for each split ace. As to "4", "5" or "10" cards, these are not split (and there is a footnote to that effect on the "4" card, FIG. 4). If the cards illustrated are studied, it will be noted that identical cards are not always split, depending on the dealer's card showing, i.e., in FIG. 9 the player does not split "9's" if the dealer has a "7", "10" (or equivalent jack, queen or king value) or ace showing.

Block 50 is marked "DRAW ONE CARD". The player may "bust" (go over twenty-one), i.e., if he draws a card value of ten, but inevitably the dealer will draw from "2" or "3" up to "17" or better, so the player must not stand where this instruction is given, i.e., at twelve, but instead must try to better his hand.

Block 52 is marked "DOUBLE YOU GET ONE CARD". Blackjack can be played, socially or in a family, with scoring rather than betting or with chips or other markers having no value. Money stakes are involved in Los Vegas casinos, for example. In the event of a real or imaginary bet, a double is a chance to double the bet. In this case, the cards are placed face up in the front of the "bet" and then the bet is doubled. The dealer will give one card.

The other block I have elected to use, in order to simplify what has to be shown on the cards and yet to provide complete instructions, is block 54 which references certain other cards to the ace card when one of the cards is an ace.

Other footnotes or legends at the bottoms of the cards will be self-explanatory.

By using my blackjack cards, a player can learn to increase his percentage of winning. To obtain this percentage edge, I have used "winning strategy" or "basic strategy" based on current knowledge and advice in playing blackjack, in which the odds may have been computed by some authorities using computers to perform computations. Various charts and forms have been developed by others for blackjack player instruction. Charts, books, and pamphlets are not needed with my invention. My cards, when they are dealt to the player, instantly inform him in a simple way, exactly how he should play his hand. The winning percentage of this strategy becomes evident over a long period of playing, although the results may not be evident or even favorable in playing a few hands. By using these cards enough times, the player gradually and effortlessly becomes a proficient player, so that he will have memorized the information on my cards and will no longer need them. With this much accomplishment, he may then progress on to card counting. Card counting involves varying play based on the change of odds due to knowledge of what cards have already bee played and, hence, what cards remain in the deck. For example, if an above average number of cards have been played with a count of ten, then chances are reduced that cards with a count of ten will be dealt.

I have accomplished my objectives by a set of playing cards using a grid system of letters and numbers, in a horizontal and vertical manner, representing different cards and combinations of cards, so contrived and arranged upon the faces of the cards, that at a glance the player knows the proper action to take. In fact, a beginning player can immediately play like an advanced player. The method of use of the cards will be evident from mere examination of the cards (with a rudimentary knowledge of the game) and also will be evident from the foregoing description and from the drawings.

In sales of my blackjack cards, I anticipate associating a booklet of simple, basic instructions on how to play the game and how to use the cards. Such a booklet would be particularly useful for someone purchasing my cards who has no knowledge at all of blackjack. Such a booklet could also include some materials of more general interest (i.e., the history of the game) or some collateral information, etc. This sort of material is suggested in the legend in FIG. 7: "READ BLACKJACK'S GOLDEN RULES IN BOOKLET". Nothing further needs to said about any booklet or the like merchandised with my cards, as such booklet may or may not be used and the contents, if used, will vary depending on the selections of the writer. My invention, instead, concerns the information on the cards themselves, which was devised from careful study and research, from experimentation with various designs, and from considerable testing and practice with experimental materials.

Having thus described my invention, I do not wish to limit myself to the exact format shown and described. Instead, I wish to cover those variations of my design which will occur to those skilled in the art after learning of my invention, and which properly fall within the scope of my invention.

I claim:

1. A deck of cards for learning and improving in blackjack, comprising:
    a. a deck including fifty-two cards having markings indicating four conventional suits of spades, hearts, diamonds and clubs and each suit having thirteen conventional serially ranking cards including ace, king, queen, jack and numbers ten to two, and
    b. each card having printed thereon information arranged horizontally and vertically in correlating rows and files, the margins of said rows and files being serially marked, one with various card values and with indicia that these values are assigned to the dealer's card showing and the other being marked with the value of the player's card on which the information is printed plus the value of each other card that could be associated as the second card of the player, and at the intersecting areas of rows and files there being course of action indicia as to the action the player should take in blackjack, whether to stand, split, double or draw to some named level.

2. The subject matter of claim 1 in which there are lines forming blocks about said course of action indicia at the intersecting areas of rows and files.

3. The subject matter of claim 2 in which at least the majority of blocks each covers an area of more than the intersection of one row and one file and there being only one course of action indicia for each such block indicating the common action that should be taken as to all intersecting rows and files within each such block.

4. The subject matter of claim 1 in which said cards have suit and ranking markings at corner locations leaving the rest of the card faces for printing of said information which extends substantially from right to left margins of each card horizontally and which extends throughout the major extent of each card vertically.

5. The subject matter of claim 1 in which said files are marked with said various card values and with said indicia that these values are assigned to the dealer's card showing, and in which said rows are marked with said value of the player's card plus said value of each other card that could be associated as the second card of the player.

* * * * *